Patented Feb. 17, 1931

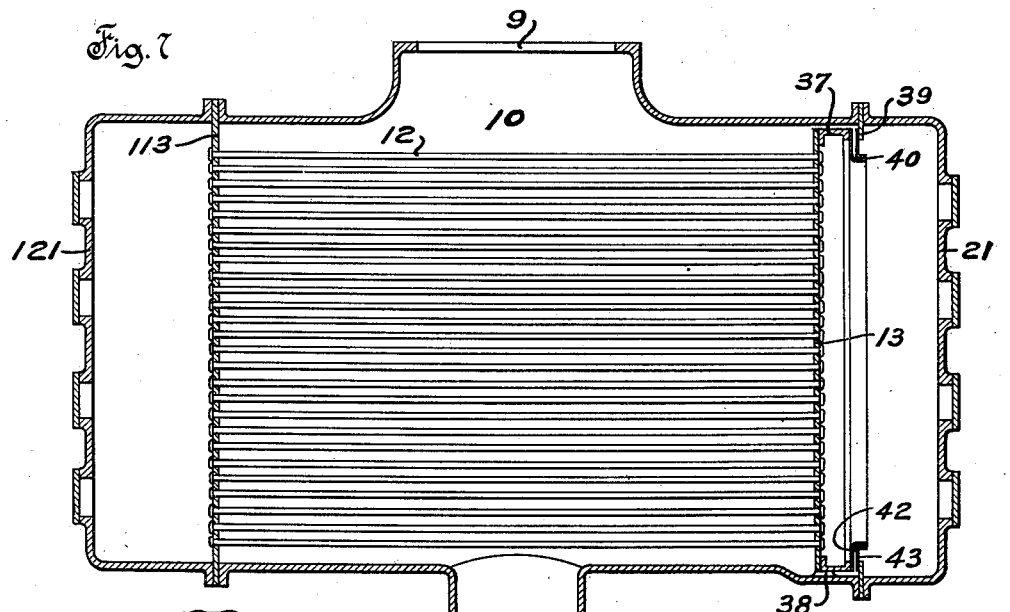
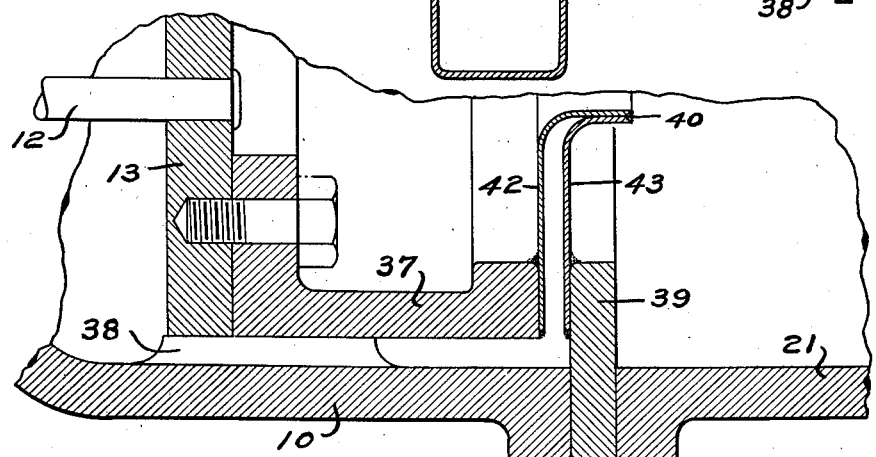

1,792,469

UNITED STATES PATENT OFFICE

PELLE ANDERSSON, OF MILWAUKEE, WISCONSIN, ASSIGNOR TO ALLIS-CHALMERS MANUFACTURING COMPANY, OF MILWAUKEE, WISCONSIN, A CORPORATION OF DELAWARE

EXPANSION JOINT

Application filed March 1, 1928. Serial No. 258,249.

The present invention relates generally to improvements in the construction of expansion joints, and relates more specifically to an improved joint for permitting relative expansion of a pair of associated elements such as the housing and tube support of a surface condenser.

An object of the invention is to provide an improved expansion joint for sectional casings or conduit walls, which is simple in constructon, efficient in operation, and which may be readily applied to relatively large casings or pipe lines. Another object of the invention is to provide an improved expansion joint especially applicable to devices such as surface condensers, which will permit free expansion of the heat-transferring tubes relative to the condenser housing. A further object of the invention is to provide an improved expansion joint especially applicable to structures wherein it is desirable to movably support one of the relatively expansible elements directly upon the other. Still another object of the invention is to provide an expansion joint which will normally effectively eliminate escape of fluids, and which may be readily repaired in case undesirable leakage occurs for some abnormal reason. These and other objects and advantages will appear from the following description.

A clear conception of a number of embodiments of the invention and of the mode of constructing and the manner of operating devices constructed in accordance with the improvement, may be had by referring to the drawings accompanying and forming a part of this specification in which like reference characters designate the same or similar parts in the various views.

Fig. 7 is a central vertical section through a surface condenser showing the tube sheet and the main casing connected by means of an internally disposed expansion joint.

Fig. 8 is an enlarged fragmentary sectional view of the internally disposed expansion joint illustrated in Fig. 7.

Figure 1:
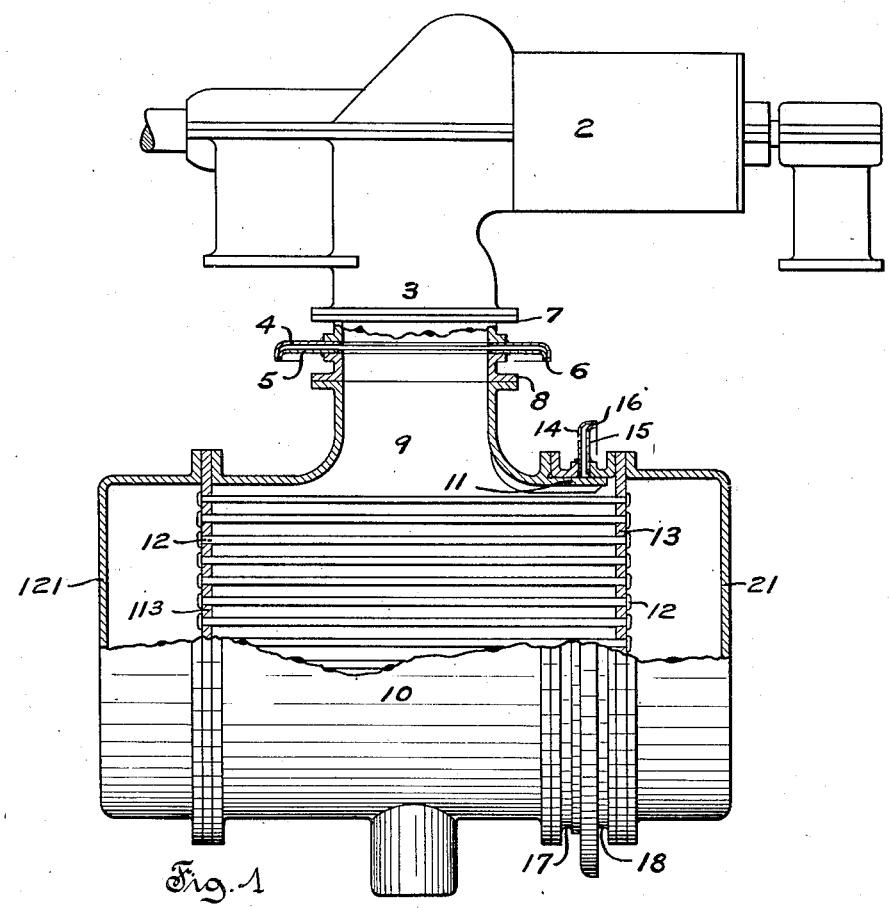
Fig. 1 is a part sectional side elevation of a combined turbine and surface condenser unit embodying several forms of the improved expansion joint.
Figure 2:
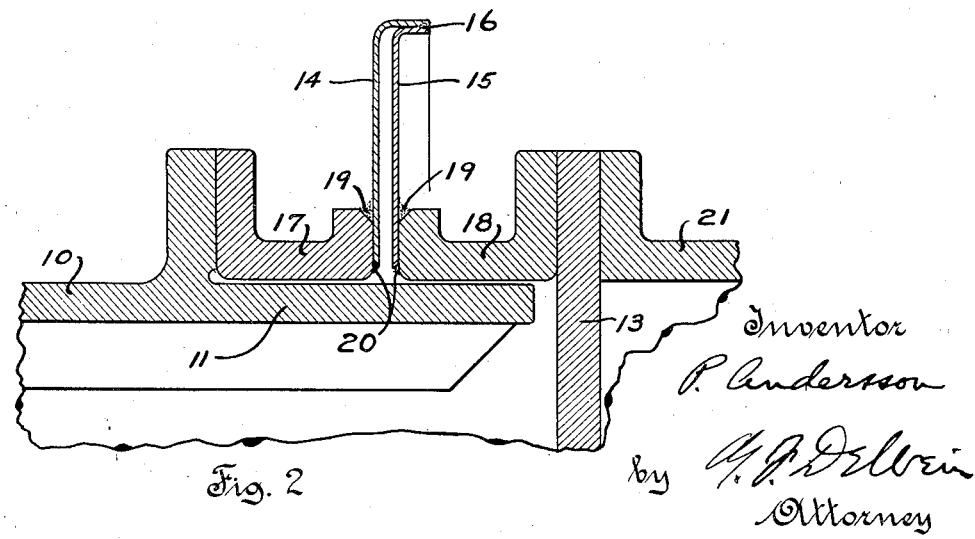
Fig. 2 is a fragmentary enlarged sectional view of one of the improved expansion joints applied to the exterior of a surface condenser casing.

Referring specifically to Figs. 1 and 2, the combined turbine and condenser unit comprises generally a steam turbine 2 having a downwardly directed exhaust portion 3; a surface condenser consisting of a main casing 10 having an inlet 9 and a plurality of heat transferring tubes 12 located within the casing 10; a vertical expansion joint connecting the turbine exhaust portion 3 with the condenser inlet 9; and a horizontal expansion joint between the main casing 10 and the corresponding ends of the tubes 12. The condenser tubes 12 are supported in tube sheets 13, 113, the latter of which is rigidly confined between an end of the main casing 10 and a fixed end head 121, and the former of which is movable with the opposite end head 21 relatively to the casing 10 in accordance with differences in expansion between the tubes 12 and the casing 10.

The vertical expansion joint consists of a pair of coaxial annular elements 7, 8, the former of which is connected directly to the turbine exhaust portion 3, and the latter of which is connected directly to the condenser inlet 9. The elements 7, 8 are provided with adjacent end surfaces which are spaced apart longitudinally of the axis of the joint. A deflectable plate 4 is secured to the lower end surface of the upper element 7 by welding or otherwise, and has an annular integral flange which extends downwardly from the plate 4 some distance below the upper end surface of the element 8. Another deflectable plate 5 is secured to the upper end surface of the lower element 8 by welding or otherwise, and also has an annular integral flange located within the flange of the plate 4. The flanges of the plates 4, 5 extend in the same direction along the axis of the joint, and are integrally united at their outer edges 6 by welding, riveting or otherwise. It will be noted that when relative expansion occurs between the exhaust portion 3 of the turbine and the inlet 9 of the condenser, the elements 7, 8 will move relatively to each other, such motion being permitted by the deflectable plates 4, 5 and the interconnected integral flanges associated with these plates.

The horizontal expansion joint associated with the condenser, consists of a pair of coaxial annular elements 17, 18, the former of which is connected directly to the main condenser casing 10, and the latter of which is connected directly to the movable tube sheet 13 and end head 21. The elements 17, 18 are provided with adjacent end surfaces which are spaced apart longitudinally of the axis of the condenser. A deflectable plate 14 is secured to the end surface of the element 17 by welded joints 19, 20 as shown in Fig. 2, and has an annular integral flange extending away from the plate a sufficient distance to span the gap between the elements 17, 18. Another deflectable plate 15 is secured to the end surface of the element 18 by welded joints 19, 20, and is also provided with an annular integral flange located within the flange of the plate 14. The integral flanges of the plates 14, 15 are rigidly connected at their outer edges by a welded joint 16. As shown in Figs. 1 and 2, the condenser casing 10 may also be provided with a lip 11 extending along and in close proximity to the upper inner portions of the elements 17, 18, this lip being adapted to assume part of the weight of the element 18 and the associated tube sheet 13 and end head 21, in case the expansion joint plates 14, 15 are not capable of properly assuming this weight. The plates 14, 15 permit the tubes 12 to expand relatively to the casing 10, or vice versa, without subjecting the elements to undesirable stresses.

Figures 3, 4:
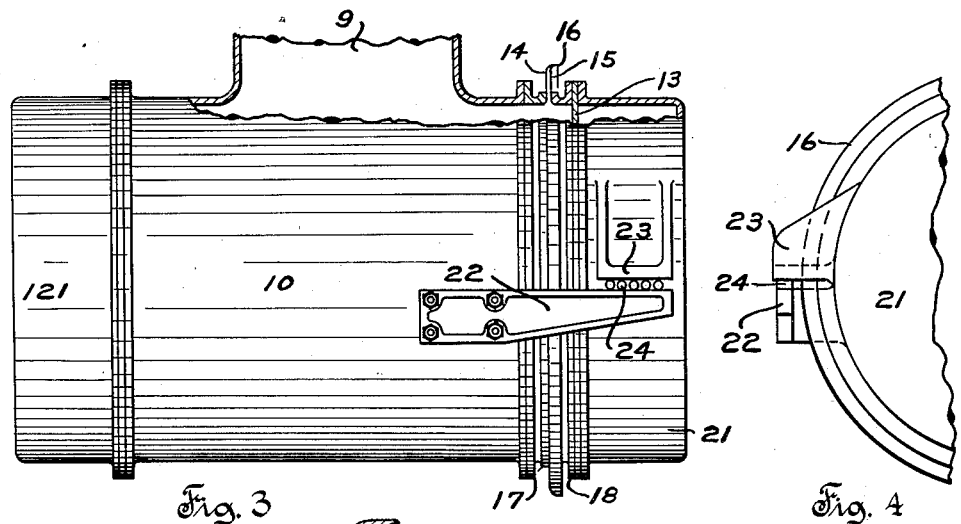
Fig. 3 is a part sectional side elevation of a surface condenser wherein one of the tube sheets is movably supported upon the main condenser casing, and wherein relative motion of the parts is permitted by one of the improved expansion joints.
Fig. 4 is a fragmentary end view of the condenser disclosed in Fig. 3, showing the antifriction supporting means for the movable tube sheet and end head.

Referring specifically to Figs. 3 and 4, the condenser shown therein is provided with an expansion joint similar to the horizontal joint of Figs. 1 and 2, but the supporting lip 11 has been replaced by a special anti-friction support for the movable end head 21. This special support comprises a pair of rails 22 secured to the opposite sides of the main casing 10 of the condenser and projecting beyond the expansion joint in close proximity to the movable end head 21. The movable end head 21 is provided with supporting lugs 23 which coact with rollers 24 which in turn coact with the rails 22. When relative expansion between the tubes 13 and the main casing 10 occurs, the rollers 24 permit relatively free movement of the tube sheet 13 and movable head 21 without danger of binding, and without subjecting the deflectable plates of the expansion joint to undesirable stresses.

Figure 5:
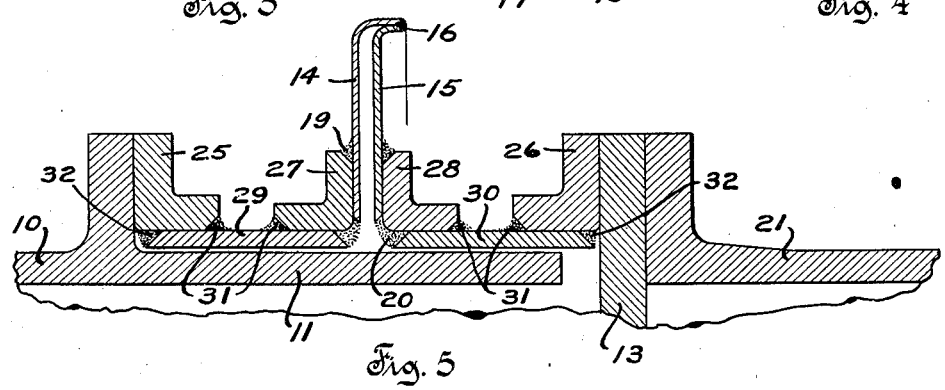
Fig. 5 is an enlarged fragmentary sectional view of a modified form of the improved expansion joint.

Referring specifically to Fig. 5, the improved expansion joint disclosed therein comprises annular members of special formation. The member of the expansion joint which is secured to the main condenser casing 10 consists of a pair of annular elements 25, 27 secured to a tubular sheet metal member 29 by means of external and internal welds 31, 32. The element 25 is connected directly to the main casing 10 while the element 27 is secured to the deflectable plate 14 by means of outer and inner welds 19, 20. The member of the expansion joint which is secured to the tube sheet 13 consists of a pair of annular elements 26, 28 secured to a tubular sheet metal member 30 by means of external and internal welds 31, 32. The element 26 is connected directly to the tube sheet 13 and to the end head 21, while the element 28 is secured to the deflectable plate 15 by means of outer and inner welds 19, 20. The tubular sheet metal members 29, 30 may be of any desired length thereby permitting the use of relatively standard annular elements 25, 26, 27, 28. The deflectable plates 14, 15 are rigidly connected at their outer edges 16 by means of welding or otherwise, as previously described.

Figure 6:
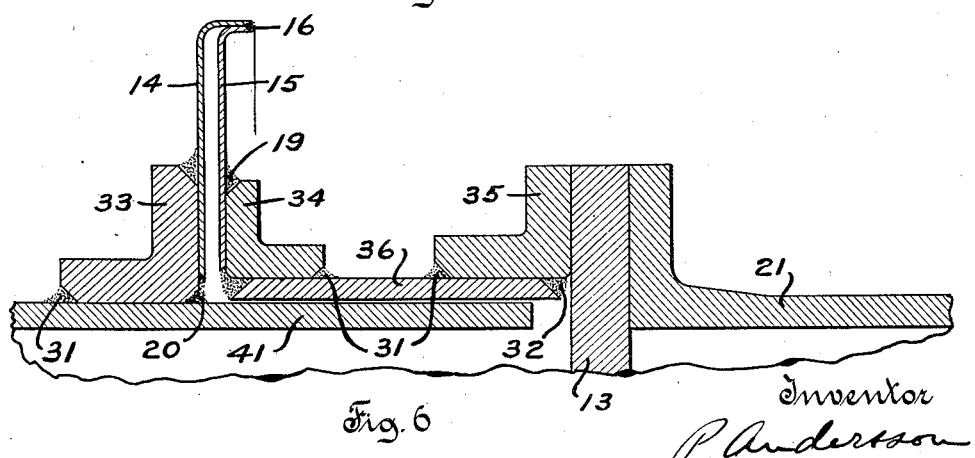
Fig. 6 is an enlarged fragmentary sectional view of another form of the improved expansion joint.

Referring specifically to Fig. 6, the improved expansion joint disclosed therein comprises an annular element 33 secured directly to the outer portion of a conduit wall 41 which extends longitudinally along the interior of the expansion joint. The other element of the expansion joint comprises annular elements 34, 35 which are welded or otherwise rigidly attached to a sheet metal tubular member 36 of suitable length, and which are secured to the deflectable plate 15 and the tube sheet 13, respectively. As in the structures previously described, the various parts of this expansion joint may be welded to each other and the deflectable plates 14, 15 have their edge portions 16 rigidly united.

Referring specifically to Figs. 7 and 8, the condenser disclosed therein is provided with an internal expansion joint located between the main condenser casing 10 and the movable tube sheet 13. The movable tube sheet 13 is provided with a detachable annular collar 37 and an annular plate 39 is secured between the condenser casing 10 and the end head 21. The collar 37 and the plate 39 are spaced apart, and inwardly extending deflectable plates 42, 43 are attached to the collar and plate respectively. The plate 42 has an inner annular flange extending across the space, and the plate 43 is provided with a flange extending in the same direction as that of the plate 42, the edge portions 40 of these flanges being rigidly united by welding or otherwise. The tube sheet 13 and the collar 37 are slidably associated with one or more supporting lugs 38 formed on the casing 10. It will be apparent that this internal expansion joint functions to permit relative expansion between the tubes 12 and the casing 10, the tube sheet 13 and collar 37 sliding upon the lugs 38 during such relative expansion.

From the foregoing description it will be apparent that the improved expansion joint readily permits relative expansion between the elements connected by the deflectable plates, without danger of having fluid escape past the plates. The relatively large bends between the annular flanges and the remaining portions of the plates, permit considerable relative movement without undesirably straining the connections between the plates and the adjoining parts. By providing flanges which extend in the same direction with respect to the deflectable plates, connecting portions having relatively large radii may be utilized between the flanges and the bodies of the plates. The flanges may also be more readily connected by virtue of their extension in the same direction, from one side of the expansion joint, and in the case where the flanges are located externally of the housing, the joint between the plates is at all times accessible from the exterior of the housing. While welded joints are utilized throughout in the specific disclosures made herein, it will be understood that other types of unions may be employed without departing from the present invention.

It should be understood that it is not desired to limit the invention to the exact details of construction herein shown and described, for various modifications within the scope of the claims may occur to persons skilled in the art.

It is claimed and desired to secure by Letters Patent:

1. In an expansion joint, a pair of elements having relatively movable adjacent end portions separated by a space, a deflectable plate rigidly attached to one of said elements and having an integral flange spanning said space, said flange being gradually laterally curved at its junction with said plate, and a deflectable plate rigidly attached to the other of said elements and to said flange.

2. In an expansion joint, a pair of coaxial elements having relatively movable adjacent end portions separated by a space, a deflectable plate rigidly attached to one of said elements and having an integral flange spanning said space concentrically of said elements, and a deflectable plate rigidly attached to the other of said elements and having an integral flange rigidly attached to said first mentioned flange concentrically of said elements, both of said flanges being gradually laterally curved at their junctions with said plates.

In testimony whereof, the signature of the inventor is affixed hereto.

PELLE ANDERSSON.